May 3, 1938. J. G. MACDONALD Re. 20,714

ELECTRIC FAN

Original Filed Sept. 3, 1935 4 Sheets-Sheet 1

Inventor.
John G. Macdonald.
by H. J. S. Dennison
Attorney

May 3, 1938. J. G. MACDONALD Re. 20,714

ELECTRIC FAN

Original Filed Sept. 3, 1935 4 Sheets-Sheet 2

Inventor.
John G. Macdonald.
by
A. J. Edmunds
Attorney

May 3, 1938. J. G. MACDONALD Re. 20,714

ELECTRIC FAN

Original Filed Sept. 3, 1935 4 Sheets-Sheet 3

Inventor.
John G. Macdonald.
by H. J. Drummond
Attorney

May 3, 1938. J. G. MACDONALD Re. 20,714

ELECTRIC FAN

Original Filed Sept. 3, 1935 4 Sheets-Sheet 4

Inventor.
John G. Macdonald.
by
Attorney

Reissued May 3, 1938

Re. 20,714

UNITED STATES PATENT OFFICE 20,714

ELECTRIC FAN

John G. Macdonald, Toronto, Ontario, Canada

Original No. 2,037,250, dated April 14, 1936, Serial No. 39,057, September 3, 1935. Application for reissue October 14, 1937, Serial No. 168,941

13 Claims. (Cl. 230—274)

This invention relates to an improvement in electric fans, of the character utilizing a series of vanes for deflecting the air currents from the fan which vanes are oscillated by a mechanism coacting with the motor-driven fan.

My improvement consists of a simplified oscillating mechanism to move the deflecting vanes, a suitable metal case, having special design features, to surround the working mechanism of the fan so as to act as a support and also a protection all of which features are constructed to enhance the appearance of the fan.

Further objects of the invention are to provide an electric fan of the character referred to that is strong, compact and durable, thoroughly reliable for its intended purpose, very light in construction, having very few parts to need repair and comparatively inexpensive to manufacture, and which will not be easily upset and will operate quietly.

With the foregoing and other objects in view the invention consists of a novel construction, combination and arrangement of parts as will be hereinafter more specifically described in reference to the accompanying drawings, wherein is disclosed an embodiment of the invention.

In the drawings wherein like reference characters denote corresponding parts throughout the several views:—

Figure 1:
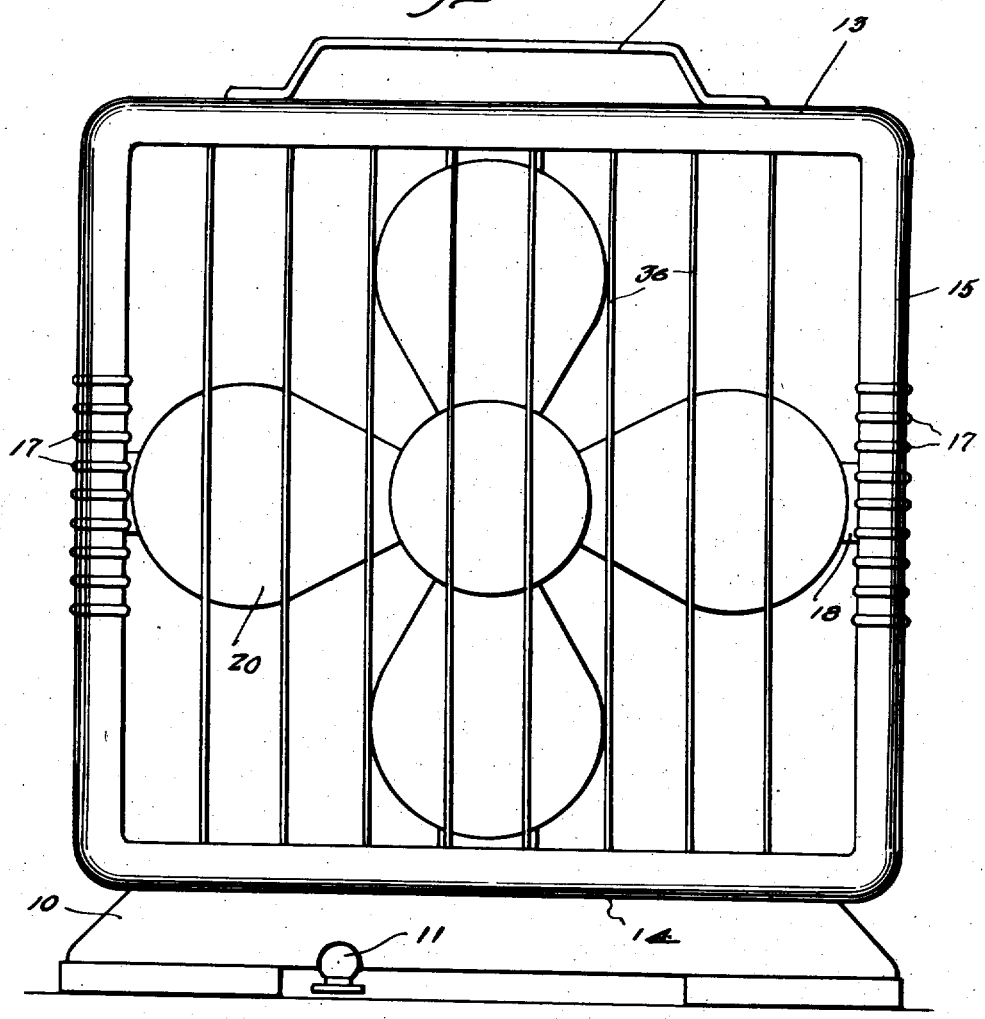
Figure 1 is a front elevation of the improved electric fan embodying the principles of the present invention.
Figure 8:
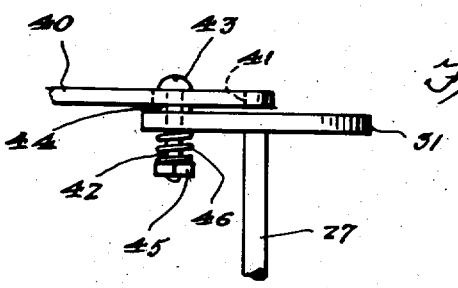
Figure 8 is an enlarged side elevation of the eccentric connection between the connecting link and the drive shaft.
Figure 2:
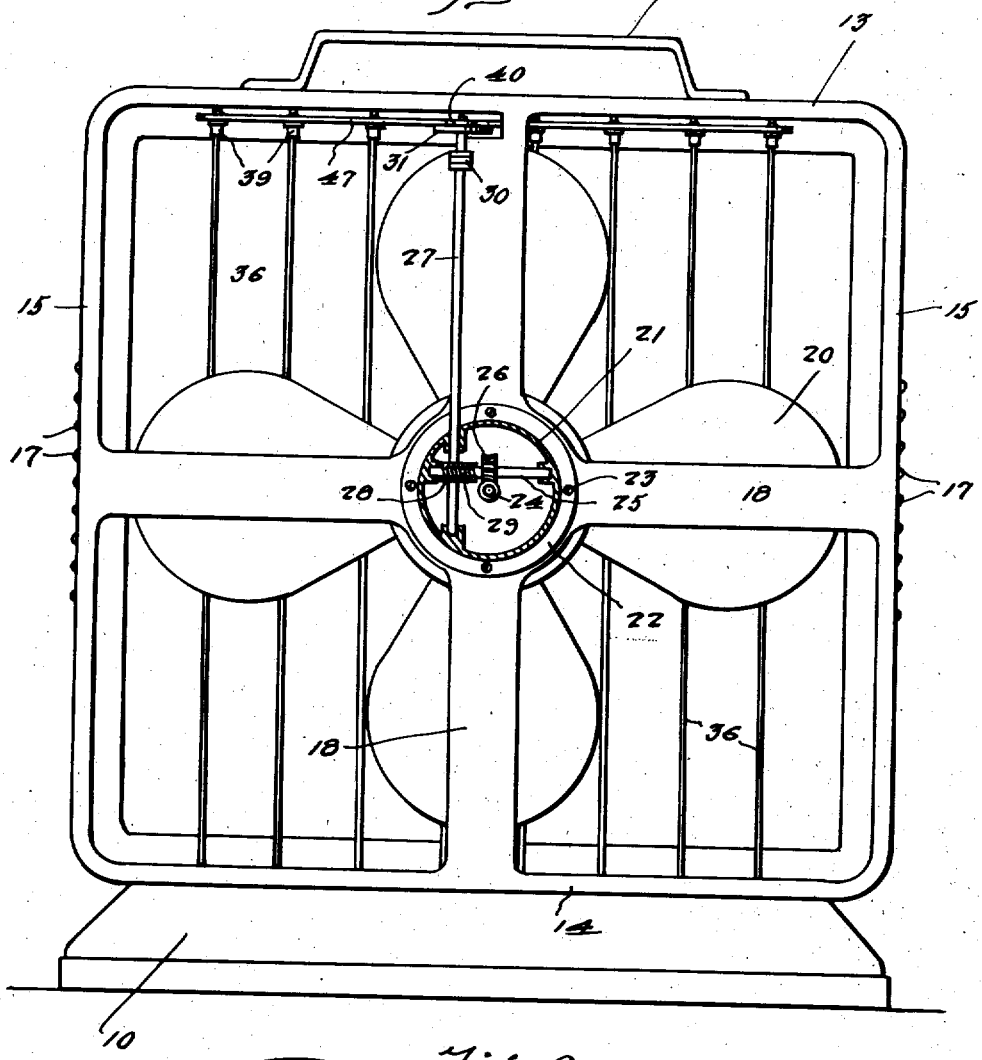
Figure 2 is a rear elevation thereof showing parts in vertical section.
Figure 9:
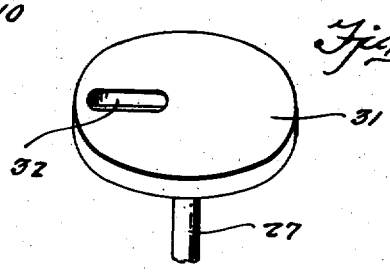
Figure 9 is a perspective view of the disc on the terminal of the drive shaft.
Figure 3:
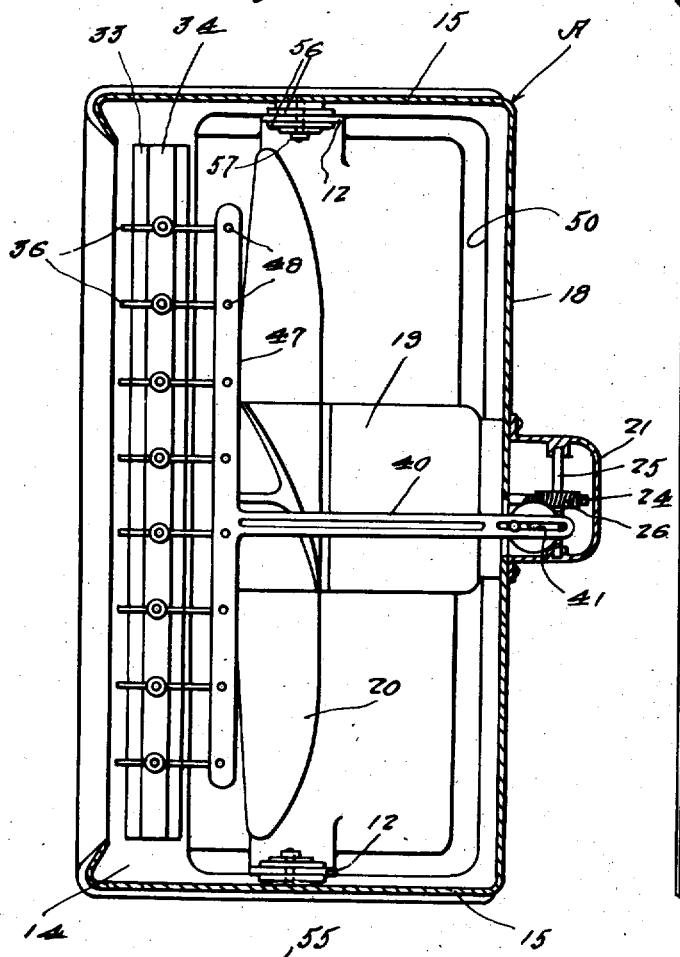
Figure 3 is a horizontal section taken substantially on the line 3—3 of Figure 4 and looking downwardly.
Figure 5:
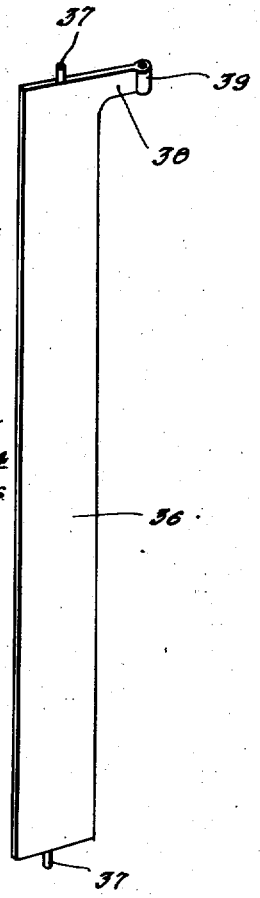
Figure 5 is a perspective view of one of the deflecting vanes removed from the casing.
Figure 7:
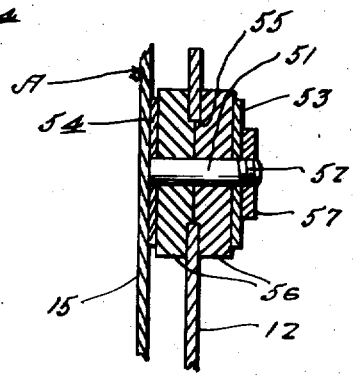
Figure 7 is an enlarged vertical section through the pivotal connection between the supporting arms and the casing.
Figure 4:
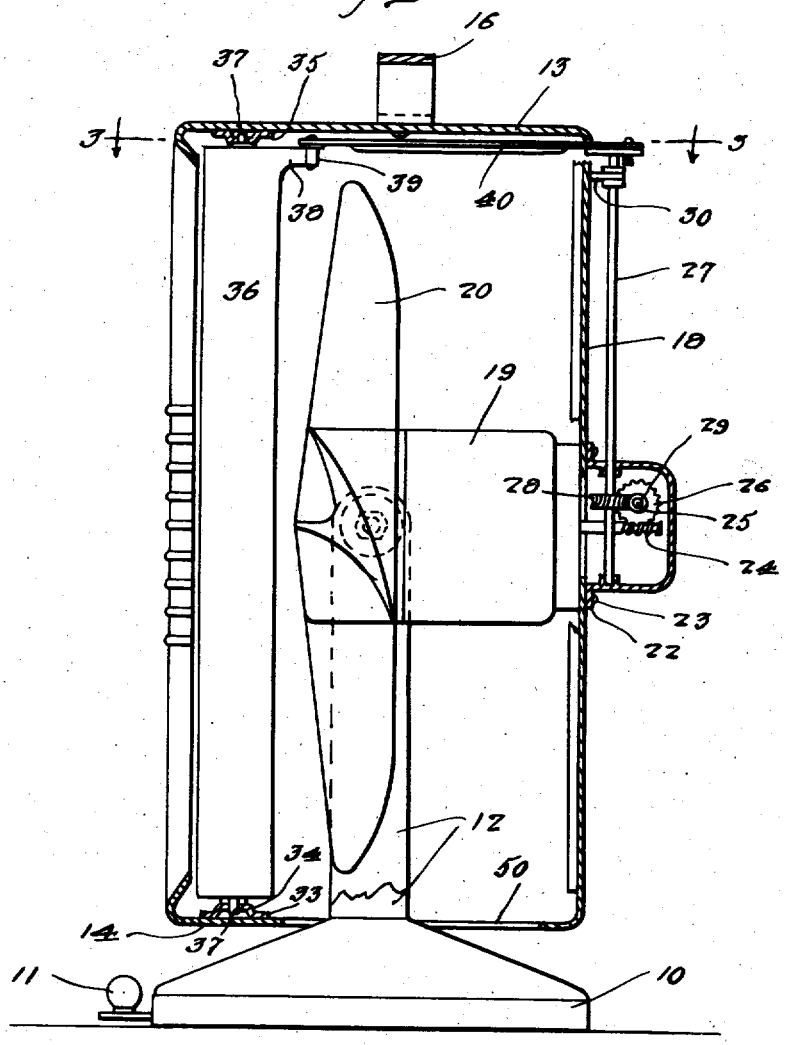
Figure 4 is a detailed vertical section thereof having parts broken away.
Figure 6:
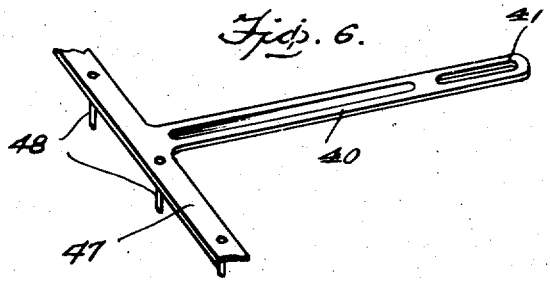
Figure 6 is a fragmentary perspective view of the connecting link for oscillating the deflecting vanes.

Referring to the drawings in detail the numeral 10 indicates an oblong base which may be formed of metal or bakelite. Carried by the base is a conventional switch arm 11 of a switch not shown, for controlling the electric current that drives the fan. Rising from the base at each end are the vertical supporting arms 12. To enhance the appearance and add symmetry and balance I prefer to make the casing A of a rectangular configuration. This casing is formed of light sheet metal having integral top and bottom walls 13, 14, respectively, and side walls 15. The casing A is open at forward and the rear ends to allow currents of air to pass therethrough. The handle 16 is secured to the top wall 13. On intermediate portions of the side walls 15 spaced horizontal ribs 17 are formed to enhance the appearance of the fan. Across the rear open end of the casing A are the crossed braces 18. The outer ends of the vertical portions of the crossed braces are joined with the top and bottom walls of the casing respectively. The ends of the horizontal portion of the crossed braces are respectively joined to the opposite side walls 15. The braces thus serve to effectively reinforce the thin walls of the casing against vibration or drumming action. The crossed braces merge with each other at the center of the rear open end of the casing where there is supported an electric motor 19 and the motor is housed in the casing. The motor 19 drives the fan 20. On the rear side at the juncture of the crossed braces 18 there is a gear casing 21 having a flange 22 bolted as at 23 to the crossed braces. The armature shaft of the electric motor 19 is formed with a rearward extension which projects into the gear housing 21 and is formed with a worm gear 24. Within the gear housing 21 is a transverse horizontal shaft 25 journaled at its opposite ends in the walls of the housing. On an intermediate portion of the shaft 25 is a gear 26 which meshes with the worm gear 24.

The drive shaft for oscillating the deflecting vanes is indicated at 27 and this shaft is shown arranged in a vertical position. The lower end of the shaft 27 extends through the gear housing 21 and has journal bearings on the top and bottom wall of the housing. On the portion of drive shaft 27 within the housing there is a gear 28 which meshes with a worm gear 29 on the shaft 25. The upper end of drive shaft 27 terminates below the top wall 13. Near the top of the upper vertical portion of the cross brace 18 is a bearing bracket 30 that supports the upper end of the drive shaft 27. Above the bearing bracket 30 there is a disc 31 secured to the terminal of the drive shaft 27, said disc having a radial slot 32. Bearing bars 33 and 35 having longitudinal ribs 34 provided with bearing openings at regular intervals are secured respectively in parallel relation to the top and bottom walls of the casing in spaced relation to the forward edge and serve also to reinforce the said walls.

A series of deflecting vanes 36 having aligned pivot extensions 37 journalled in the bearing openings of the bars are each shown provided with a rearward extension 38 terminating in a crank sleeve 39.

A common operating member for the vanes is here shown in the form of a T-shaped member the head 47 of which carries a series of crank pins 48 which extend into the crank sleeves 39 of the vanes so that when the T-shaped member is displaced bodily in a horizontal plane the vanes will be caused to swing on their individual pivot mountings.

The stem portion, which is here shown integral with the head portion, extends rearwardly to overlie the disc 31 which is radially slotted as at 32 and the stem 40 is provided with a longitudinal slot 41.

A crank bolt 42 is slidably adjustable in the disc slot 32, being frictionally held in any selected eccentric adjustment by the tension of a spring 46 arranged between the disc 31 and nut 45. The upper end of the crank bolt is operatively disposed within the slot 41 of the stem 40 of the vane operating member with the crank bolt head 43 overlapping the stem and a spacer 44 is disposed between the stem and disc to minimize friction.

With this construction it will be seen that the operation of the crank 42 in the slot 41 of the stem 40 effects the bodily displacement of the T-shaped vane operating member which simply rides on the vanes and on the crank bolt in a floating manner requiring no pivotal mounting on the casing and reducing the number of parts and friction to a minimum and by simply sliding the crank bolt 42 in the disc slot against the frictional holding action of the spring the degree of oscillation of the vanes may be readily controlled.

The forward edges of the casing walls are shown as flanged inwardly to overlie the vanes in a protective manner and serve as a reinforcement.

It will be noted that the fan, motor and vanes are all housed compactly within the casing which is supported in a substantially balanced manner directly above the base which affords a distinct advantage over prior constructions in that a neat, compact and rugged device is produced which will not be easily upset.

The entire casing and enclosing assembly is shown mounted for pivotal adjustment and to provide for such adjustment in a neat and effective manner with the casing spaced closely above the base 10, the casing is provided with an opening 50 in the bottom through which the vertical supporting arms 12 extend.

Pivot mounting pins 51 extend inwardly from the side walls 15 of the casing through enlarged openings 55 and resilient discs 56 of rubber are clamped against opposite sides of the arms 12 about the openings 55 and pins 51 by means of the clamping washers 53 and 54, clamping pressure being effected by threaded engagement of the nut 57 with the threaded end 52 of the pin so that the rubber discs are held under compression and the frictional contact of the elements will permit pivotal adjustment of the casing and will retain such adjustment unaffected by any vibration set up in the operation of the fan, and eliminating the necessity of providing hand clamping screws.

It will be noted that the rubber discs insulate the casing from the base and provide a very desirable resilient mounting which will absorb vibrations which would otherwise be transmitted to the base resulting in more quiet operation.

While I have shown and described a preferred embodiment of my invention for purposes of illustration, it is to be understood that various structural modifications and adaptations may be resorted to within the scope of the appended claims without departing from the essential spirit of the invention.

What I claim as my invention is:—

1. In an electric fan the combination with a motor driven fan and a series of vanes actuated by the fan motor for deflecting the air stream, of a common casing housing all of said elements in a compact co-operative assembly, a base, said casing having its bottom directly overlapping the base and having an opening therethrough, support arms extending upwardly from the base directly through the opening into the interior of the casing, and means pivotally connecting said arms with the casing walls interiorly of the casing.

2. In an electric fan the combination with a motor driven fan and a series of vanes to be actuated by the fan motor for deflecting the air stream, of a common casing housing all of said elements in a compact assembly, said casing having a cross-brace connecting the opposite walls in a reinforcing manner and secured to and forming the sole support for the fan motor, a gear reduction unit mounted on the rearward side of said motor rearwardly of said cross brace and connected with the motor shaft, and means forming an operative connection between said reduction unit and said deflecting vanes.

3. The combination with an electric fan having a series of breeze-deflecting vanes pivotally mounted, of a common operating member pivotally connected to all of the vanes having an arm extension connected rigidly thereto for movement bodily therewith and projecting rearwardly toward the fan motor, and means forming an operative connection between said arm extension and the fan motor.

4. The combination with an electric fan having a series of breeze-deflecting vanes pivotally mounted, and crank extensions from said vanes, of a common operating bar connecting all of said cranks and having a lateral extension rigid therewith and extending angularly rearward, and means forming a combined sliding and pivotal operative connection between said rigid lateral extension and said fan motor.

5. Means as claimed in claim 3 in which said last mentioned means includes an eccentric drive having a direct sliding and pivotal connection with said rigidly connected extension of the common operating member.

6. In an electric fan having a series of vanes pivotally mounted, the combination therewith of, a common operating member of T-shape having the head portion operatively connected to all of said vanes, a speed reduction unit operated by the fan motor, and crank means operatively interposed directly between the gear unit and the stem portion of said T-shaped member.

7. In an electric fan the combination with a motor driven fan and a series of vanes actuated by the fan motor for deflecting the air stream, of means forming an operative connection between said fan motor and said vanes including means adjustable to vary the degree of pivotal displacement of said vanes.

8. Means as claimed in claim 7 in which said last mentioned means comprises a radially slotted motor driven disc having a crank slidably adjustable in the slot and frictionally retained in its adjusted positions and an operating extension from said vanes pivotally and slidably engaging said crank.

9. In an electric fan the combination with a motor driven fan and a series of vanes actuated by the fan motor for deflecting the air stream, of a common casing housing all of said elements in a compact co-operative assembly, and bearing bars of longitudinally ribbed form secured to and reinforcing the top and bottom walls of the casing at the front and having bearing openings in the rib formation and said vanes having trunnions extending thereinto.

10. An electric fan having in combination, a casing, a motor-driven fan in said casing, air deflecting vanes at the forward end of the casing operable by the fan motor, said casing being of polygonal form presenting thin sheet metal walls, and a transverse motor support formed of thin metal members disposed in angular intersecting relation, said support members having reinforcing ribbed formations pressed thereinto and being connected respectively to opposite side walls and top and bottom walls of the casing in reinforcing relation.

11. An electric fan comprising in combination a motor driven fan, air-deflecting vanes operated by said motor, a common casing housing all of said elements, a base, supports on said base, and a pivotal connection between the casing and supports including bodies of resilient rubber compressed between the casing and supports and forming a vibration-absorbing connection.

12. In an electric fan, a base, a casing including side walls and open at each end, a pair of supporting arms rising from the base and pivoted at their free ends to intermediate portions of the side walls, crossed braces carried by the walls of the casing bridging one open end of the casing, a motor driven fan carried by the cross braces and surrounded by the walls of the casing, air deflecting vanes pivoted to oscillate on a vertical axis adjacent the other open end of the casing and forwardly of the fan, a gear housing carried by the cross braces, a vertical shaft journaled at its lower end in the casing, means coacting with the motor driven fan to rotate the shaft, a connecting rod pivoted at one end to the vanes, and an eccentric connection between the shaft and the other end of the connecting rod to oscillate the deflecting vanes 13. In an electric fan the combination with a motor-driven fan and a series of vanes actuated by the fan motor for deflecting the air stream, of a common casing housing all of said elements in a compact co-operative assembly, a base, and means pivotally mounting said casing and the enclosed units therein on said base directly thereabove free to rock adjustably on a horizontal axis substantially about the centre of gravity of the entire assembly, said last-mentioned means including mounting pivots between the base and casing projecting inwardly from the side walls of the casing substantially in right-angular intersecting horizontal alignment with the motor axis and free of projection beyond the outer side faces of the said side walls.

JOHN G. MACDONALD.